United States Patent [19]

Sakamoto

[11] Patent Number: 5,096,773
[45] Date of Patent: Mar. 17, 1992

[54] BIAXIALLY ORIENTED POLYESTER FILM

[75] Inventor: Seiji Sakamoto, Machida, Japan

[73] Assignee: Diafoil Company, Limited, Tokyo, Japan

[21] Appl. No.: 532,199

[22] Filed: Jun. 1, 1990

[30] Foreign Application Priority Data

Jun. 2, 1989 [JP] Japan ................. 1-140782

[51] Int. Cl.$^5$ ............................. B32B 5/16
[52] U.S. Cl. ........................ 428/323; 428/327; 428/329; 428/331; 428/480; 428/908.8; 428/910; 524/430; 524/599
[58] Field of Search ............ 428/323, 328, 327, 329, 428/330, 331, 908.8, 910, 480; 524/430, 599

[56] References Cited

U.S. PATENT DOCUMENTS

| | | | |
|---|---|---|---|
| 3,821,156 | 6/1974 | Farrar | 523/220 X |
| 4,092,289 | 5/1978 | Remmington | 523/220 |
| 4,320,207 | 3/1982 | Watanabe et al. | 521/54 |
| 4,603,073 | 7/1986 | Renalls et al. | 428/147 |
| 4,725,472 | 2/1988 | Okabe et al. | 428/141 |
| 4,727,108 | 2/1988 | Kagiyama et al. | 524/425 |
| 4,818,581 | 4/1989 | Katoh et al. | 428/143 |
| 5,006,589 | 4/1991 | Sakamoto et al. | 524/430 |

FOREIGN PATENT DOCUMENTS

0345644A1 6/1989 European Pat. Off. .
0335858A1 7/1989 European Pat. Off. .

*Primary Examiner*—George F. Lesmes
*Assistant Examiner*—Christopher Brown
*Attorney, Agent, or Firm*—David G. Conlin; Peter F. Corless

[57] ABSTRACT

A biaxially oriented polyester film containing 0.05 to 3 wt % of agglomerates of primary particles of aluminum oxide having an average particle size of 5 to 40 nm, the agglomerates having an average particle size of 50 to 400 nm. The film of the present invention is excellent in the wear resistance against various members such as a metal pin, and suitable for various industrial purposes including a base film of a magnetic recording medium.

8 Claims, 1 Drawing Sheet

BIAXIALLY ORIENTED POLYESTER FILM

BACKGROUND OF THE INVENTION

The present invention relates to a biaxially oriented polyester film having excellent wear resistance and scuff resistance. More particularly, the present invention relates to a biaxially oriented polyester film which is suitable for a magnetic recording medium.

Polyester films, which are excellent in physical and chemical properties, have been widely used as a base material of various products. Above all, a biaxially oriented polyethylene terephthalate film, which is excellent especially in mechanical strength, dimensional stability and flatness, is used for various purposes including a base film of a magnetic recording medium and a capacitor dielectric.

The major problem in a film for a magnetic recording medium which has been increasingly and widely used is in wear resistance thereof.

When a film comes into contact with a metal pin at a high speed, the friction therebetween becomes higher to cause scuffs on the film and generation of powder (worn-out powder) scraped off the film by wear.

The present inventor has proposed an improvement in wear resistance of a film in Japanese Patent Application Laid-Open (KOKAI) No. 1-306220 (1989), etc. where particles of aluminum oxide having a high Mohs hardness are mixed in the film.

The present inventor, however, has found that when particles such as aluminum oxide particles are mixed in a film, a new problem is brought about. While a film containing those particles exhibits a very excellent effect on the prevention of the scuffing of the film and the production of worn-out powder during the contact with a metal pin, when the film coated with a magnetic layer thereon is wound up, the particles existing on the surface of the base film which comes into contact with the magnetic layer often cause scuffs on the magnetic layer surface to deteriorate the electromagnetic properties. This disadvantage is more remarkable when the condition for orientating a film is strict, i.e., stretch ratio in the machine direction or transverse direction is larger.

As a result of researches for solving this problem, the present inventor has found that the use of particular agglomerate of aluminum oxide particle can effectively solve the problem. The present invention has been accomplished based on this finding.

SUMMARY OF THE INVENTION

The present invention provides a biaxially oriented polyester film containing 0.05 to 3 wt % of agglomerates of primary particles of aluminum oxide having an average particle size of 5 to 40 nm, the agglomerates having an average particles size of 50 to 400 nm.

DETAILED DESCRIPTION OF THE INVENTION

Figure 1:
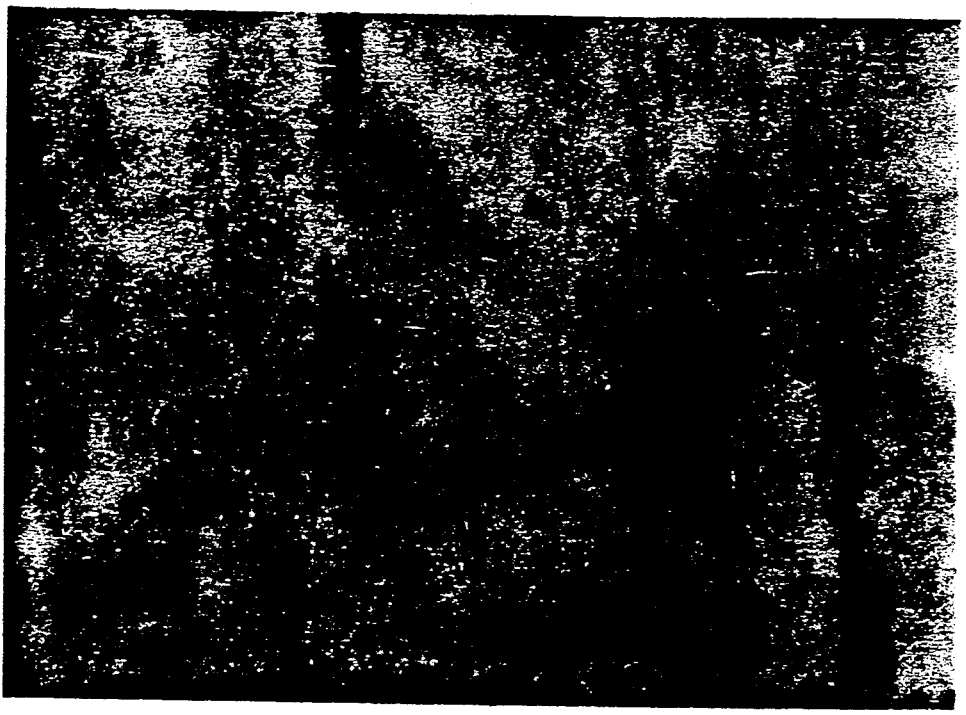
FIG. 1, shows a transmission electron microphotograph of the cross section of the polyester film of Example 1.

The polyester referred to in the present invention is a homopolyester or a copolyester obtained from an aromatic dicarboxylic acid such as terephthalic acid and 2,6-naphthalenedicarboxylic acid or esters thereof and ethylene glycol as the main starting material. The copolymerizing component includes a dicarboxylic acid such as isophthalic acid, phthalic acid, adipic acid and cebacic acid, a hydroxycarboxylic acid such as p-hydroxymethoxybenzoic acid, and a diol such as diethylene glycol, propylene glycol, butanediol, 1,4-cyclohexanedimethanol and neopentyl glycol. These copolymerizing components are used alone or in combination. A polyester wherein not less than 80 mol % of the constitutional repeating units is ethylene terephthalate unit or ethylene 2,6-naphthalate unit and the intrinsic viscosity $[\eta]$ is 0.55 to 0.75 is preferably used in the present invention.

The polyester film referred to in the present invention is a biaxially oriented polyester film obtained from the polyester described above. A conventional method may be employed for producing the biaxially oriented polyester film. For example, the polyester is melt extruded into a sheet at a temperature generally from 270° to 320° C., quenched at 40° to 80° C. to obtain an amorphous sheet. The amorphous sheet is then sequentially or simultaneously stretched in the machine and transverse directions. The stretch ratio is usually from 2 to 6 in the machine direction and from 2 to 6 in the transverse direction, and the stretch temperature is from 80° to 150° C. The stretched film is then subjected to heat treatment at a temperature from 160° to 250° C. to obtain the biaxially oriented polyester film (method described in Japanese Patent Publication (KOKOKU) No. 30-5639 (1955)). Each stretching in the machine and transverse directions may be carried out either at a single stage or at multiple stage, and heat treatment may be carried out between each stretchings of multi-stage stretching. Re-stretching in the machine direction, in the transverse direction or in both the directions may be employed between the biaxial stretching and the subsequent heat treatment.

The characteristic feature of the present invention is in the use of aluminum oxide of a specific form of a specific particle size.

In the present invention, agglomerates which are obtained by appropriately agglomerating fine primary particles of aluminum oxide are used. When the agglomerates are used, the particles are unlikely to strip off the film surface due to appropriate dispersion of stretching stress during film formation, and additionally, favorable friction characteristics which are not expected from uniform primary particles are obtained, since the agglomerates provide the film surface with comparatively gentle protuberances.

One of the advantages of using the agglomerates is that the friction coefficient can be maintained at a low level after repetition of running of the film. Although it is necessary to reduce the friction coefficient of the film for favorable handling properties of the film, the friction coefficient of a film containing uniform fine particles is gradually increased with repetitive runnings of the film, from the present inventor's experiences. The use of the agglomerates of aluminum oxide particles can avoid this defect in the conventional art and can improve the utility of the film.

The average particle size of the agglomerates of aluminum oxide is 50 to 400 nm, preferably 70 to 300 nm. If the average particle size is less than 50 nm, the wear resistance of the film against a metal pin is slightly inferior, and the friction coefficient of the film after repetitive running is increased. If it exceeds 400 nm, scuffs are produced on the magnetic layer surface which contacts with the film to deteriorate the electromagnetic characteristics.

The average particle size of the primary aluminum oxide particles which constitute the agglomerates is 5 to 40 nm. If this average particle size is less than 5 nm, the agglomerates often combine with each other so firmly that the combination of the agglomerates is not divided even by the stretching stress, thereby making it difficult to exert the advantageous effect of the present invention. If it exceeds 40 nm, the agglomerates separate and slip off the film surface to deteriorate the electromagnetic characteristics.

The effect of using the specified agglomerates in the present invention is exhibited most favorably in a high-strength film. The effect is especially remarkable when the amorphous sheet in the above-described film-forming process is strongly stretched in the machine and transverse directions, in other words, when a large stretching stress acts on the agglomerate particles in the film. More specifically, the effect of the present invention is especially remarkable where the F-5 value in either the machine direction or the transverse direction is not less than 12.0 kg/mm$^2$, preferably not less than 14.0 kg/mm$^2$ in the case of polyethylene terephthalate film, and not less than 15.0 kg/mm$^2$, preferably not less than 20.0 kg/mm$^2$ in the case of polyethylene 2,6-naphthalate film.

As an example of aluminum oxide particle suitable for the present invention, aluminum oxide particle obtained by a thermal decomposition may be mentioned. This type of particle is ordinarily produced by a flame hydrolysis of anhydrous aluminum chloride, and the particles thus produced contain those having a particle size of from 5 to 40 nm and often contain coarse agglomerates having a particle size exceeding 1 $\mu$m. The agglomerates having appropriate particle sizes used in the present invention can be easily obtained by pulverizing such coarse agglomerates.

For the pulverization of the coarse agglomerates, roll mill, ball mill, oscillating rod mill, oscillating ball mill, pan mill, roller mill, impact mill, stirring grinder mill, hydrodynamic energy mill, etc. are usable. Ultrasonic dispersion may be also employed, if necessary. However, care must be taken because too strong an ultrasonic dispersion inconveniently disperses the particles to primary particles or those approximate thereto. Treatment such as classification and filtration may be also adopted together with pulverization.

In the agglomerates of aluminum oxide, a part of, for example, less than 30 wt % of the aluminum oxide may be replaced by oxide of Si, Ti, Fe, Na, K, etc. The surface of the agglomerates may be modified by various surface treatment agent such as a silane coupling agent and a titanium coupling agent.

As a method for mixing the agglomerates into a polyester, a method of adding the agglomerates to the reaction system in the form of an ethylene glycol slurry at the initial stage of the production of a polyester, and a method of blending the agglomerates directly with a polyester before film formation may be employed. The former method is preferred because it is easy and convenient.

The content of the agglomerates based on the polyester film is from 0.05 to 3 wt %, preferably from 0.1 to 0.8 wt %. When the content is less than 0.05 wt %, improvement in scuff resistance against a metal pin is insufficient. Addition of more than 3 wt % of the agglomerates is also unfavorable because it frequently produces scuffs on the magnetic layer surface when the film comes into contact with the magnetic layer.

According to the present invention, by mixing the specific aluminum oxide agglomerates into a polyester, it is possible to produce a film having an extremely excellent wear resistance that the film hardly suffers from scuffing when the film comes into contact with a metal pin and that the film hardly produces scuffs on the magnetic layer surface when the film comes contact with the magnetic layer. The polyester film according to the present invention has further advantageous characteristics that the friction coefficient after repetitive running is not so different from the initial friction coefficient. Other kind particles may be contained to provide a film with a lower initial friction coefficient.

One of the examples of the particles which may be added together with the aluminum oxide agglomerates is so-called deposited particles (internal particles). The deposited particles are metal compounds deposited as fine particles during the production of a polyester. For example, there is mentioned deposited particles of an alkali metal or an alkali metal compound which exists in the reaction system during ester exchange reaction or esterification reaction, or before or after the reactions. The alkali metal or alkali metal compound is deposited as inert fine particles having a particle size of from 0.1 to 5 $\mu$m in the presence or absence of a phosphorus compound. The existence of the deposited particles in a proportion of from 0.01 to 1 wt % based on the polyester film can improve the running property of the film.

Another example for the particles which may be added together with the aluminum oxide agglomerates is so-called additive particles (external particles). The additive particles mean particles externally added during the production of a polyester. For example, kaolin, talc, carbon, molybdenum sulfide, gypsum, rock salt, calcium fluoride, zeolite, calcium phosphate, silicon dioxide and titanium oxide particles are mentioned.

It is preferred that the average particle size of the additive particles is larger than that of the aluminum oxide agglomerates and in the range from 0.1 to 3 $\mu$m. The amount of the additive particles is preferably 0.05 to 2 wt % based on the polyester film.

A fine powder of a heat-resistant polymer may be also used as the additive particles. A typical example thereof is a fine powder of a copolymer of a monovinyl compound having only one aliphatic unsaturated bond in the molecule and a compound having two or more aliphatic unsaturated bonds as the cross-linking group in the molecule (described in Japanese Patent Publication (KOKOKU) 59-5216 (1984)). The fine powder of a heat-resistant polymer is not restricted to those described above, and fine powders of thermosetting phenol resin, thermosetting epoxy resin, thermosetting urea resin, benzoguanamine resin and fluorine resin such as polytetrafluoroethylene are usable. The average particle size of the fine powder of a heat-resistant polymer is preferably 0.05 to 5 $\mu$m, and the amount thereof used is preferably 0.01 to 3 wt % based on the polyester film.

The biaxially oriented polyester film according to the present invention has an excellent wear resistance and can be used for various purposes. Especially, it is suitable for a base film of a magnetic recording medium. The biaxially oriented polyester film exerts its excellent effect when used not only as a base film for a video tape but also as a base film for an audio tape. In these fields, with the recent spread of the machines having a dubbing system of a speed twice higher than a conventional one, for example, a radio with twin cassette taperecorder and a compact audio system, the tape comes into contact with a metal pin, a magnetic head, etc. at a higher speed. The advantages of the present invention are effectively shown in this case.

The present invention will be explained in more detail with reference to the following non-limitative examples. "Part" in the examples and comparative examples represents "part by weight".

The properties referred to in the examples and comparative examples were measured as follows.

(1) Average particle size

The particle sizes of the primary particles and the agglomerates of aluminum oxide in the film were obtained by observing the section of the film through a transmission electron microscope. The diameter corresponds to the 50% volume fraction in the distribution of the volume of equivalent spheres was regarded as the average particle size of the primary particles or agglomerates.

The particle sizes of the primary particles or agglomerates of a dry powder and in a slurry were measured by using a scanning electron microscope.

(2) Wear resistance against a metal pin

A film was run at the rate of 4 m/sec in contact with a metal pin (diameter: 6 mm, surface roughness: 3 S) plated with hard chromium at a contact angle of 135° and a tensile force of 50 g.

Aluminum was deposited on the contact surface of the film and the degree of scuffing was visually judged in accordance with the following five ranks.

Rank 1: Many scuffs were observed and most of them were deep.
Rank 2: Comparatively many scuffs were observed and some of them were deep.
Rank 3: Comparatively small amount of scuffs were observed and few of them were deep.
Rank 4: A few scuffs were observed.
Rank 5: Almost no scuffs were observed.

(3) Degree of wear of magnetic layer surface due to base film surface

The degree of scuffing on the magnetic layer surface due to the contact with the base film surface was observed by using a model and the electromagnetic characteristics were measured.

A magnetic tape was first produced.

In a ball mill, were mixed and dispersed for 48 hours 200 parts of a magnetic fine powder, 30 parts of polyurethane resin, 10 parts of nitrocellulose, 10 parts of a vinyl chloride-vinyl acetate copolymer, 5 parts of lecithin, 100 parts of cyclohexanone, 100 parts of methyl isobutyl ketone and 300 parts of methyl ethyl ketone, and thereafter 5 parts of polyisocyanate was added to the dispersion to prepare a magnetic coating composition. After applying the magnetic coating composition on one of the surfaces of a polyester film, the magnetic orientation was made before the coating was sufficiently dried and hardened. Thereafter, the coating was dried, thereby forming a magnetic layer of 2 μm thick. The coated film was subjected to surface treatment by a supercalender and slit into a width of ½ inch, thereby obtaining a video tape.

The thus-obtained magnetic tape was run at a rate of 5 m/sec in contact with a metal pin having a diameter of 30 mm, on which a polyester film was wound, at a contact angle of 135° and a tensile force of 100 g.

The degree of scuffing on the magnetic layer surface was visually judged in accordance with the following five ranks.

Rank 1: Many scuffs were observed and most of them were deep.
Rank 2: Comparatively many scuffs were observed and some of them were deep.
Rank 3: Comparatively small amount of scuffs were observed and few of them were deep.
Rank 4: A few scuffs were observed.
Rank 5: Almost no scuffs were observed.

The electromagnetic characteristics of the magnetic tape obtained above were measured by using a video deck Model NV-3700 produced by Matsushita Electric Industrial Co., Ltd.

VTR head output

VTR heat output was measured at a frequency of 4 MHz by a synchroscope. The blank was regarded as 0 dB and the relative value was expressed by dB.

Number of drop-outs

The video tape which had recorded signals of 4.4 MHz was played back, and the number of drop-outs were measured for about 20 minutes by a drop-out counter produced by Okura Industry K.K. and the number of drop-outs per minute was employed.

(4) Measurement of friction coefficient

The kinetic friction coefficient of the base film of a magnetic tape was measured in accordance with a method of ASTM D-1894. The measurements were repeated 50 times on the same magnetic tape repeating winding and rewinding the tape.

(5) F-5 value

The F-5 value was expressed by the stress (kg/cm$^2$) at 5% elongation. The stress was measured by an Instron tensile tester.

Five test pieces 150 mm in the machine direction and 6.25 mm in the transverse direction were cut out of a biaxially oriented film and were subjected to a tensile test at a rate of pulling of 50 mm/min, a chuck interval of 50 mm and a gauge interval of 50 mm.

The load at the time of 5% elongation was read out of the S—S curve obtained, and F-5 value was calculated from the following equation;

$$F\text{-}5 = \frac{\text{Load (kg) at the time of 5\% elongation}}{\text{Sectional area (mm}^2\text{) of test piece}}$$

The results were shown by average values of five measurements.

EXAMPLE 1

Agglomerates comprising primary particles of aluminum oxide having an average particle diameter of 20 nm were dispersed in ethylene glycol and gradually dispersed by a sand grinder, thereby obtaining agglomerates having an average particle size of 80 nm.

Separately, 100 parts of dimethyl terephthalate, 65 parts of ethylene glycol and 0.09 part of magnesium acetate were charged into a reactor, and subjected to ester exchange reaction while removing methanol under heating. The temperature was raised to 230° C. in 4 hours after the initiation of the reaction, wherein the ester exchange reaction was substantially finished.

Then, 0.25 wt % of aluminum oxide agglomerates having an average particle size of 80 nm and 0.1 wt % of silicon oxide particles having an average particle size of 400 nm, and further 0.4 part of ethyl acid phosphate and 0.04 part of antimony trioxide were added, and polymerization was carried out by an ordinary method to obtain polyethylene terephthalate having an intrinsic viscosity of 0.63.

After drying the polyester obtained, it was extruded from an extruder at 290° C. in the form of a sheet and quenched by an electrostatic contact method to obtain an amorphous sheet of 150 μm thick. The amorphous sheet was stretched by 3.8 times in the machine direction and by 3.6 times in the transverse direction and re-stretched by 1.06 times in the machine direction to obtain a biaxially oriented polyester film of 9.8 μm thick reinforced in the machine direction.

The F-5 values of the thus-obtained polyester film in the machine direction and the transverse direction were 14.1 kg/mm$^2$ and 10.2 kg/mm$^2$, respectively. The wear resistance against a metal pin of the film and the properties of the film coated with a magnetic layer evaluated are shown in Table 1.

The transmission electron microphotograph of the cross section of the film is shown in FIG. 1. The microphotograph was obtained as follows. The film was embedded into an epoxy resin and sectioned by a microtome to prepare a sample of 200 nm thick. The microphotograph of the cross section of the sample was taken along the machine direction of the sample film by a transmission electron microscope H9000 produced by Hitachi, Ltd., under 100 kV acceleration voltage at 26000X.

EXAMPLE 2 AND COMPARATIVE EXAMPLES 1 TO 3

Biaxially oriented films were obtained in the same way as in Example 1 except that the components of the particles contained in the films were changed as shown in Table 1. The film properties evaluated are shown in Table 1.

specified by the present invention were used. The wear resistance of the film obtained was improved somewhat, however, inferior to that of the film of the present invention.

In addition, when the magnetic tapes obtained from the films of Examples 1 and 2 and Comparative Example 3 were subjected to repetitive running tests, the friction coefficient of the magnetic tape in Comparative Example 3 gradually increased, as shown in Table 2.

TABLE 2

|  | Friction Coefficient | | |
| --- | --- | --- | --- |
|  | 1st running | 20th running | 50th running |
| Example 1 | 0.30 | 0.30 | 0.31 |
| Example 2 | 0.26 | 0.25 | 0.26 |
| Comparative Example 3 | 0.31 | 0.33 | 0.35 |

What is claimed is:

1. A biaxially oriented polyester film containing about 0.05 to 3 wt % based on the film of agglomerates, the agglomerates consisting of primary aluminum oxide particles having an average particle size of from about 5 to 40 nm, and the agglomerates each having an average particle size of from about 50 to 400 nm.

2. The biaxially oriented polyester film according to claim 1, wherein the agglomerates each have an average particle size of from about 70 to 300 nm.

3. The biaxially oriented polyester film according to claim 1, wherein the primary aluminum oxide particle size is from about 5 to 20 nm.

4. The biaxially oriented polyester film according to claim 1, wherein the film further contains about 0.01 to 1 wt % based on the film of deposited particles having an average particle size of from about 0.1 to 5 μm.

5. The biaxially oriented polyester film according to claim 1, wherein the film further contains from about

TABLE 1

|  | First Particles | | | | Second Particles | | | Wear resistance against metal pin | Wear characteristics against magnetic layer surface | | |
| --- | --- | --- | --- | --- | --- | --- | --- | --- | --- | --- | --- |
|  | type | primary particle size (nm) | particle size of agglomerate (nm) | Concentration (wt %) | type | particle size (μm) | Concentration (wt %) |  | Rank of scuffing | S/N | Drop-out |
| Example 1 | Al$_2$O$_3$ | 20 | 80 | 0.25 | SiO$_2$ | 0.4 | 0.1 | 5 | 5 | +2.0 | 1.6 |
| Example 2 | Al$_2$O$_3$ | 20 | 150 | 0.50 | CaCO$_3$ | 0.5 | 0.2 | 5 | 5 | +1.9 | 1.6 |
| Comparative Example 1 | TiO$_2$ | 300 | 300 | 0.25 | SiO$_2$ | 0.4 | 0.1 | 2 | 4 | +1.6 | 2.1 |
| Comparative Example 2 | Al$_2$O$_3$ | 350 | 350 | 0.25 | SiO$_2$ | 0.4 | 0.1 | 5 | 2 | −1.6 | 7.8 |
| Comparative Example 3 | Al$_2$O$_3$ | 20 | 25 | 0.25 | SiO$_2$ | 0.4 | 0.1 | 4 | 4 | +1.7 | 2.4 |

The films obtained in Examples 1 and 2 according to the present invention were scarcely scuffed by the contact with the metal pin and could provide a magnetic tape having excellent electromagnetic characteristics because the magnetic layer was scarcely scuffed by the strong contact with the base film.

In contrast, in Comparative Example 1 in which titanium oxide particles having an average particle size of 0.3 μm and no tendency to agglomerate were used as the main particles, the film obtained had an inferior wear resistance. In Comparative Example 2 in which the primary particles of aluminum oxide particles having an average particle size of 0.35 μm and no tendency to agglomerate were used as the main particles, the film obtained easily scuffed the magnetic layer surface.

In Comparative Example 3, the aluminum oxide agglomerates in which the primary particle size was in the range specified by the present invention but the average particle size of the agglomerates was out of the range 0.05 to 2 wt % of additive particles having an average particle size of from about 0.1 to 3 μm.

6. The biaxially oriented polyester film according to claim 1, wherein the film further contains from about 0.01 to 3 wt % of fine powders of a heat-resistant polymer, the fine powders having an average particle size of from about 0.05 to 5 μm.

7. The biaxially oriented polyester film according to claim 1, wherein the film is a polyethylene terephthalate film in which the F-5 value in either the machine direction or the transverse direction is not less than about 12.0 kg/mm$^2$.

8. The biaxially oriented polyester film according to claim 1, wherein the film is a polyethylene 2,6-naphthalate film in which the F-5 value in either the machine direction or the transverse direction is not less than about 15.0 kg/mm$^2$.

* * * * *